Jan. 11, 1966　　E. A. FITTER ETAL　　3,228,391
PULSE RATE TRANSDUCER
Filed Feb. 27, 1963
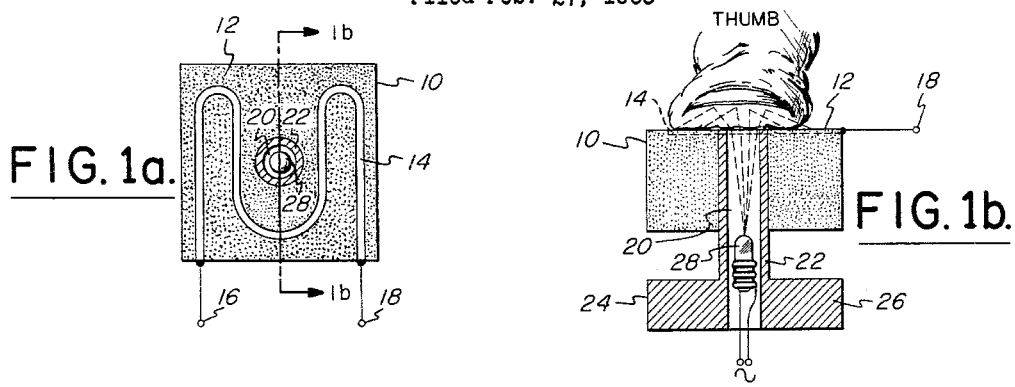
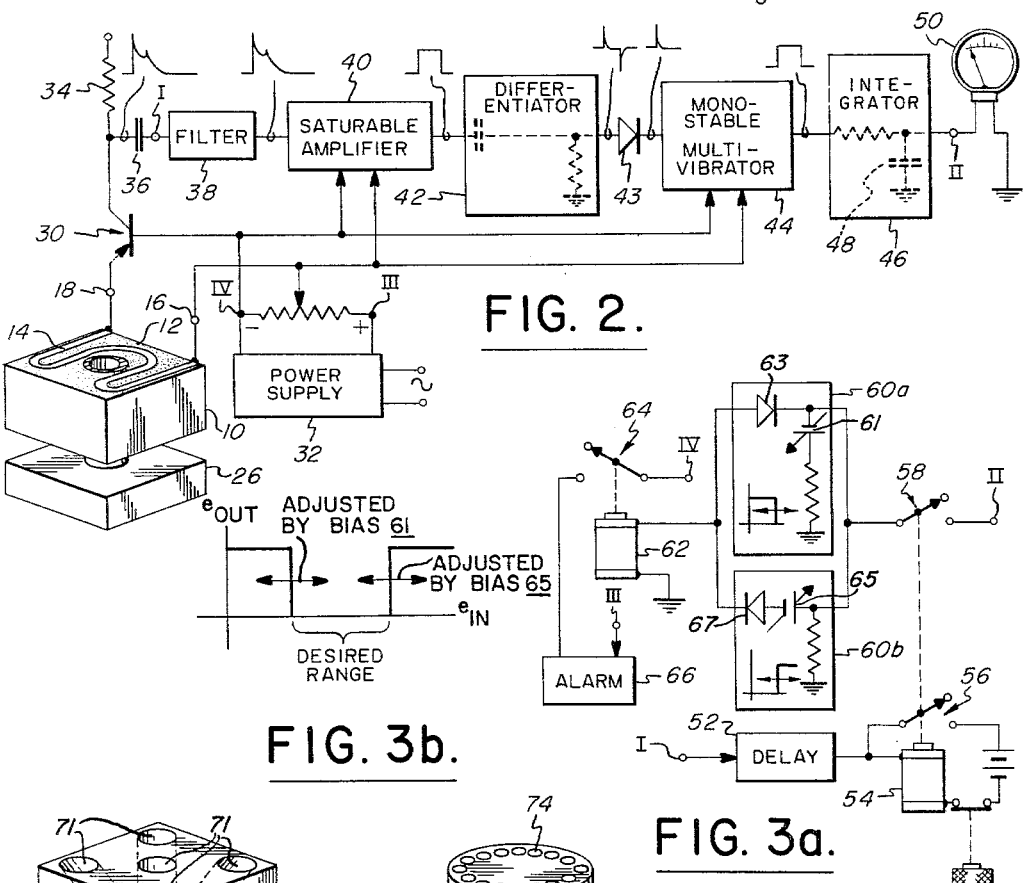
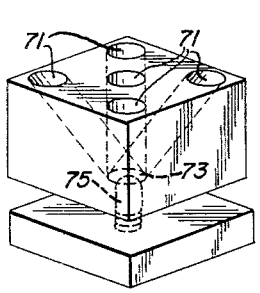
FIG. 4a.
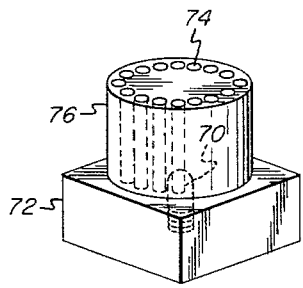
FIG. 4b.
INVENTORS.
ERNEST A. FITTER
JOHN S. GARWOOD
RICHARD E. SWARTS
BERT V. TIBLIN
DAVID S. WALKER
BY
S.C. Yeaton
ATTORNEY

3,228,391
PULSE RATE TRANSDUCER
Ernest A. Fitter, Glen Head, John S. Garwood, Manhasset, Richard E. Swarts, Northport, Bert V. Tiblin, Huntington, and David S. Walker, Little Neck, N.Y., assignors to Sperry Rand Corporation, Great Neck, N.Y., a corporation of Delaware
Filed Feb. 27, 1963, Ser. No. 261,383
5 Claims. (Cl. 128—2.05)

The present invention relates in general to apparatus useful in making cardiac examinations and more particularly to apparatus for efficiently and accurately checking the pulse rate of the heart.

Pulse rate, as is known, may be checked in a variety of ways, e.g. by means of a stethoscope and watch, or by means of an electrical transducer and meter in a calibrated circuit (U.S. Patent 3,051,165), etc. The present invention improves on this last-mentioned technique and provides a transducer that is not of necessity restricted to a few locations on the body of its wearer, but may instead be secured at almost any body location. In providing such a transducer use is made first of the translucent character of the skin and second of the light reflecting characteristics of the blood-carrying capillaries under the skin. Prior art transducers contrarily usually rely on the overall translucent qualities of certain parts of the body, e.g. the ear lobes, to sense heart beat pulses.

In its presently preferred form, the transducer of the instant invention comprises a photoresistive element and a light source integral with such element emitting light rays substantially perpendicular to the sensitive face of the element. By placing the sensitive face of the transducer against the skin, heart beat pulses are detected. That is, the light from the source enters through the translucent layer of skin and, as the capillaries fill and release blood, the absorption of light into the body is varied. Whatever light is not adsorbed reflects to the photoresistive element, which then acts to convert the reflected light to electrical signals.

Use is made of such electrical "heart beat" signals in a circuit which not only accurately measures pulse rate, but does so substantially without being affected by the strength of the sensed heart beat. This means that the aforedescribed transducer ordinarily can be used on different parts of a person's body, or on different parts of a different person's body, without ever requiring circuit recalibration. Further, the circuit in its preferred form can provide for cardiograms, be used in the measure of systolic blood pressure (without need for a stethoscope), and alarm attendants when the pulse rate varies beyond settable limits.

A principal object of the invention is to provide a transducer for sensing heart beats, such transducer being capable of being placed at almost any body location.

Another object of the invention is to provide a using circuit for the above-mentioned heart beat transducer which is so designed that calibration thereof for transducer outputs of different strengths is unnecessary.

Still another object of the invention is to provide a pulse rate measuring device which alarms when the measured pulse rate goes above or below certain pre-set limits.

The invention will be described with reference to the figures wherein:

FIGS. 1a and 1b respectively show a plan view and a side sectional view (taken along line 1b—1b of FIG. 1a) of a transducer embodying the present invention, FIG. 2 shows a perspective view of the above-mentioned transducer connected into a circuit in a presently preferred manner, FIG. 3a is a block diagram of a circuit which when when connected to the circuit of FIG. 2 provides the presently preferred form of pulse rate measuring device, FIG. 3b being a diagram useful in describing a part of the circuit of FIG. 3a, and FIGS. 4a and 4b show perspective views of transducers having forms other than as shown in FIGS. 1a and 1b.

Referring to FIGS. 1a and 1b, the transducer of the present invention has a photoresistive element 10 which is masked at 12 to provide a photoresistor 14 on the sensitive face of the element 10. The photoresistor 14 has output terminals 16 and 18. A hole 20 in the photoresistive element 10 has the sleeve 22 of a heat sink 24 friction-fitted into it, such heat sink 24 being of a material having good heat conducting qualities and being provided with a base 26. The heat sink sleeve 22 is adapted to house lamp 28. Were it not for the heat dissipating action of the heat sink 24 (i.e. heat flows down the sleeve 22 into the broad base 26) there would be a tendency for the heat generated by the lamp 28 to accumulate in the hole 20, this being so because the photoresistive element 10 is a poor conductor of heat. As a result the instant transducer would, in the vicinity of the hole 20, be sensitive to the touch, thereby making it difficult to use. Further such accumulated heat would have a tendency to break down the photoresistive element 10 and thereby change its characteristics.

As shown in FIG. 1b when, for example, the thumb of a person is pressed against the sensitive face of the element 10, light from the lamp 28 enters through the skin of the thumb and reflects in random directions and intensities off the blood capillaries (as they fill and empty) in the thumb toward the sensitive face of the element 10, thereby causing the resistance of the photoresistor 14 to change in proportion to the quantity of received light. Such changing of resistance may then be readily converted to electrical representative signals for use in measuring pulse rate.

Referring now to FIG. 2, the photoresistor 14 is shown connected into the emitter-base circuit of a transistor amplifier 30. The terminal 16 of the photoresistor is connected to receive a positive bias signal from a power supply 32, the terminal 18 of the photoresistor being connected to the emitter of the amplifier 30. The amplifier 30 output signal, which is shown varying in amplitude like a typical dicrotic pulse, is taken across an output resistor 34 in the amplifier collector circuit and applied through a coupling capacitor 36 to a filter 38 adapted to block A.C. signal components at the frequency of the power supply 32 excitation. The filter 32 output signal is applied to a saturable amplifier 40 which in turn applies its output signal to a differentiator 42. The purpose of the amplifier 40 and differentiator 42 combination is to produce a sharp pulse each time, and at substantially the same instant that the amplifier 30 starts to produce a "dicrotic" output signal. To produce such sharp pulses, the saturable amplifier 40 (which can have as many stages as is necessary) so amplifies its applied "dicrotic" heart beat signals as to be driven continually into saturation (a clipping action), thereby providing a series of square waves (each wave of which has the duration of a single dicrotic pulse). Then by the well-known techniques of square wave differentiation positive-going and negative-going pulses (representing start- and stop-times for respective heart beats) are produced.

A diode 43, which blocks the negative-going differentiator output pulses, passes the positive-going pulses to a monostable multivibrator 44. For each applied positive-going pulse, the multivibrator 44 gets driven through one fixed duration cycle, i.e. a normally non-conducting transistor in the multivibrator is turned on and then after awhile turned off. Since each positive-going pulse drives the multivibrator through one cycle, square wave pulses (one for each sensed dicrotic pulse) of fixed duration are created regardless of the magnitude or frequency of the applied heart beat signals. In other words, the leading edge of each heart beat signal is the only used portion of such signal, causing the multivibrator in response thereto to run through just one cycle to produce a fixed duration pulse having no relationship at all to the duration or magnitude of the heart beat signal. This is the very feature of the invention which allows its substantially universal use without calibration.

If desired, the diode 43 may be eliminated by making sure the multivibrator cycle of operation is of shorter duration than the duration of any one dicrotic pulse. Further, both the differentiator 42 and diode 43 may be eliminated by assuring that the multivibrator cycle of operation is longer than the duration of any one dicrotic pulse, but of shorter duration than the time between successive dicrotic pulses. With the elements 42 and 43 employed, however, the duration of the multivibrator cycle of operation may be of any time length less than the time period between successive dicrotic pulses. Thus the time period is determined by the fastest heart pulse rate possible.

The multivibrator 44 output signals are applied to an integrator 46, the capacitor 48 of which charges to a quiescent signal level directly dependent on the frequency of occurrence of the multivibrator square wave output signals. A meter 50 measures the magnitude of the signal level stored by the capacitor 48 and, being appropriately calibrated, provides an indication of pulse rate. To be realized, of course, is that the meter 50 will properly indicate pulse rate as soon as the capacitor 48 charges to a quiescent level (i.e. the level representative of the measured pulse rate), a relatively short time.

In the above circuit description, the filter 38 is an absolutely necessary item (if the power supply 32 is A.C. excited) without which the differentiator 42 would produce pulses at a very high repetition rate, i.e. the saturable amplifier 40 would amplify stray A.C. in the same manner as it does "dicrotic" heart beat signals. Should this happen, the multivibrator 44 would be likewise driven at a high repetition rate, thereby causing the capacitor 48 to charge to a quiescent point which makes the indicator 50 read off-scale continually.

Apparatus embodying the invention, in its preferred form, has the circuit of FIG. 3a connected to points I through IV of FIG. 2. With such an arrangement, limits (as to a safe range of pulse rates) may be set within which the pointer of the indicator 50 must remain. See FIG. 3b. Otherwise an alarm, e.g. a bell, is excited. Referring to FIG. 3a, a delay device 52 (providing a delay sufficient to assure that when a series of pulses is applied to the amplifier 30 input, the capacitor 48 can charge to a quiescent level) receives the amplifier 30 output signal and applies its output signal to a self-holding relay 54 having self-holding contacts 56. When excited, the relay 54 closes a switch 58 and causes the signal appearing at the output of the integrator 46 to be applied simultaneously to two circuits 60a and 60b which cooperate to define the pulse rate limits within which the alarm is "not" sounded. Should the "bucking" signal at II be less than the settable bias provided by a bias battery 61 to a diode 63 of the circuit 60a, the diode 63 conducts; should the "bucking" signal at II exceed the settable bias provided by a bias battery 65 to a diode 67 of the circuit 60b, the diode 67 conducts. The outputs of the circuits 60a and 60b are connected at a relay 62 which, when energized, closes a switch 64, thereby completing the excitation circuit for an alarm 66.

With the biases of the circuits 60a and 60b set for a particular upper and lower signal level, i.e. upper and lower pulse rates, the alarm 66, by operation of the delay device 52, cannot sound until the indicator 50 has had time to register pulse rate accurately. If, after this time, the pointer of the meter 50 registers below the set low pulse rate, the circuit 60a applies a signal to the relay 62, thereby causing it to energize and set off the alarm 66. Should the pulse rate be above the set upper limit, the circuit 60b applies a signal to the relay 62 to set off the alarm. A detected pulse rate within the set limits, which energize the relay 54 as above to cause switch 58 to close, has no effect on the alarm 66 since neither circuit 60a nor 60b (under this set of circumstances) produces an output signal. However, as soon as the pulse rate starts to climb or fall beyond the set limits, either the circuit 60b or 60a respectively produces an output signal to set off the alarm.

As stated above, the invention can be used in a variety of ways. For use in producing electrocardiograms, the signal appearing at point I may be used to drive the pen of a recording device having a strip of paper relatively movable with respect to the pen. In checking for systolic blood pressure the transducer is pressed against the body by a measurable pressure until the pointer on the indicator 50 starts to fall. The pressure at which this occurs is systolic blood pressure. If preferred pressure may be increased above the point at which the meter pointer falls to zero; then on releasing the pressure, note is made of the pressure at which the pointer starts to return to its normal position, i.e. the systolic pressure.

Obviously, the invention can take a variety of forms and be connected into a using circuit in many ways, e.g. the transducers of FIGS. 1a and 1b can be connected into the collector-base circuit instead of the base-emitter circuit as shown in FIG. 2. Also, while a photoresistive sensitive element is preferred, a photovoltaic or photoelectric element may be used. The reason for preferring the photoresistive element is that it, of necessity, must be connected into a voltage divider circuit. This means that the "sensed signal-to-circuit noise" ratio for such a device must be good, there being with such circuit indirect amplification of the sensed signal without creation or amplification of noise, i.e. a small resistance change produces a useful signal dependent on the power supply 32 biases. For example, halving the resistance of the photoresistor 14 when the emitter-base bias voltage is 10 volts would cause the voltage swing to be 5 volts (without ever creating noise).

Further, the invention is not restricted to the forms shown in FIGS. 1a and 1b but may, if preferred, take the forms shown in FIGS. 4a and 4b. In FIG. 4a a plurality of light conducting channels 71 which merge at a common point 73 conduct the light from a lamp 75 adapted to be located at the common point. In FIG. 4b a lamp 70 contained within a housing 72 shines light down a plurality of light conducting fibers 74 emitting light away from the sensitive surface of a light sensitive element 76.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for measuring the pulse rate of a person comprising means for sensing dicrotic pulses, means connected to said means for sensing dicrotic pulses for producing a trigger pulse at the start of each dicrotic pulse, a monostable multivibrator connected to said means for producing trigger pulses for receiving said trigger pulses and producing therefrom respective square wave signals all of which have the same pulse width, and integrating means connected to said multivibrator to receive the square wave signals and produce thereby an integral signal representative of pulse rate.

2. The apparatus of claim 1 including an alarm, and means for setting off said alarm when said integral signal is either greater than a first value or less than a second value.

3. The apparatus of claim 1 wherein said means for sensing dicrotic pulses comprises a heart beat sensor comprising means having a photoresistive surface and a channel running therethrough, said channel having its axis substantially perpendicular to said photoresistive surface, said photoresistive surface being adapted to change its resistance in proportion to the light falling on it, a tube in said channel having good heat conducting qualities, and a light source contained in said tube whereby the light produced by said source is directed substantially parallel to the axis of said tube, but heat generated by said source is dissipated into said tube.

4. The apparatus of claim 1 wherein said means for sensing dicrotic pulses comprises means having a light sensitive surface the electrical characteristics of which change according to the light impinging on said surface, and a light source cooperating with said means to direct its rays substantially perpendicular to and away from said face, whereby the sensor when secured with its sensitive face against the body of a person produces an electrical representation of the heart beat of said person.

5. The apparatus of claim 1 wherein said means for producing a trigger pulse comprises a bandpass filter tuned to pass frequencies at which hearts tend to beat, said bandpass filter being adapted to receive said dicrotic pulses, means connected to said filter to receive the output signals from said filter for producing a square wave signal for each dicrotic output pulse from said bandpass filter, said square wave signals being of substantially the same duration as respective dicrotic pulses, and means for differentiating the output signals from said last named means whereby short duration trigger pulses are produced which substantially coincide timewise with the leading edges of the square waves having widths similar to respective dicrotic pulse widths.

References Cited by the Examiner
UNITED STATES PATENTS

| | | | |
|---|---|---|---|
| 3,040,737 | 6/1962 | Kompelien | 128—2.05 |
| 3,087,488 | 4/1963 | Streimer | 128—2.05 |
| 3,103,214 | 9/1963 | Smith | 128—2.05 |
| 3,138,151 | 6/1964 | Chapman et al. | 128—2.05 |
| 3,154,067 | 10/1964 | Stenstrom et al. | 128—2.05 |

RICHARD A. GAUDET, *Primary Examiner.*

LOUIS R. PRINCE, *Examiner.*